Sept. 2, 1969  K. SCHRÖTER ET AL  3,465,327
ARRANGEMENT FOR INDICATING POSITION OF AN ADJUSTING
MECHANISM MOUNTED ON A ROTATABLE MEMBER
Filed Nov. 2, 1966  2 Sheets-Sheet 1

INVENTORS
KURT SCHRÖTER
CLEMENS NIENHAUS
JURGEN VOLLMER
ALFONS BURGHARDT

BY Edmund M. Jaskiewicz
ATTORNEY

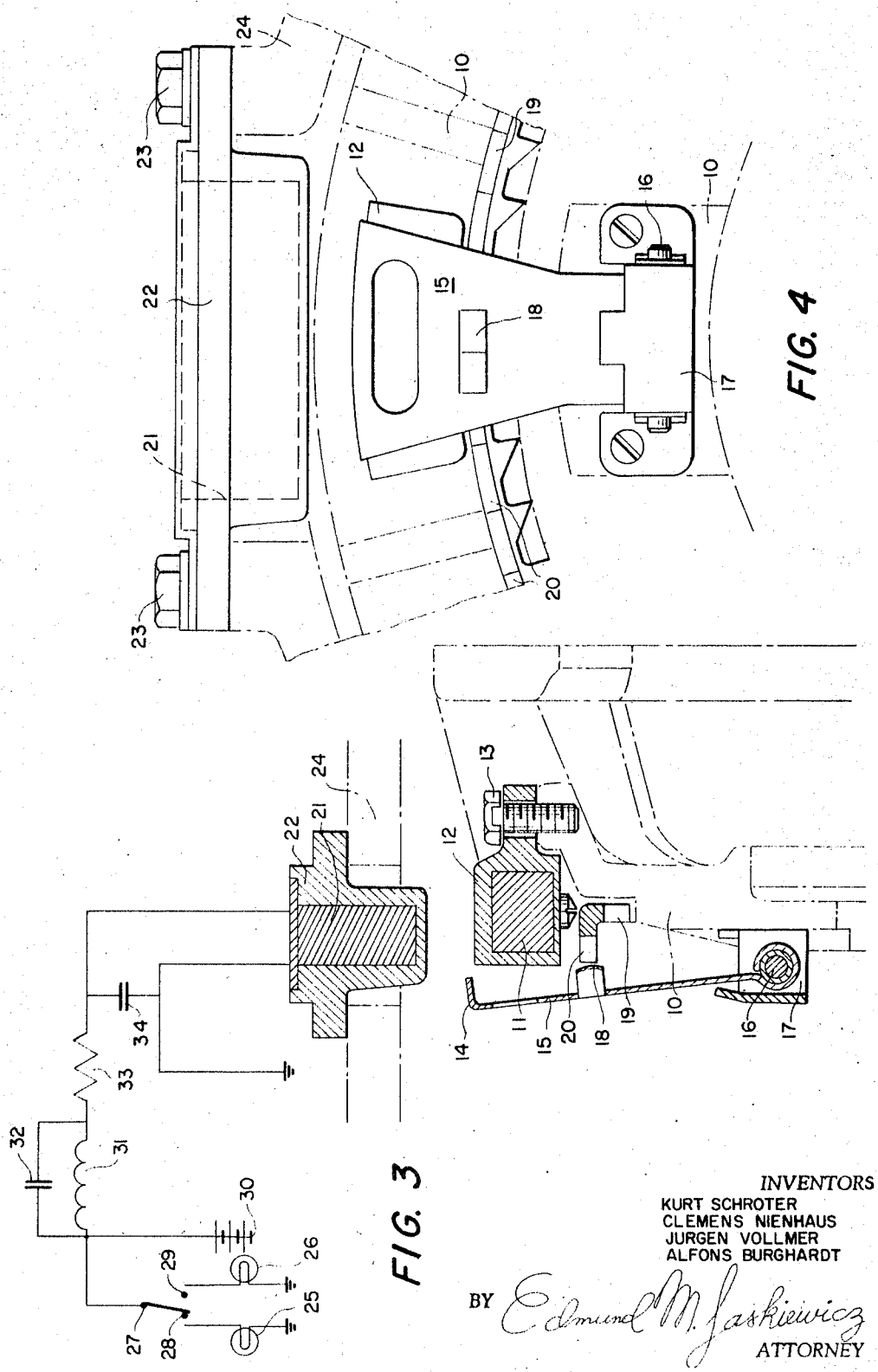

United States Patent Office 3,465,327
Patented Sept. 2, 1969

3,465,327
ARRANGEMENT FOR INDICATING POSITION OF AN ADJUSTING MECHANISM MOUNTED ON A ROTATABLE MEMBER
Kurt Schröter and Clemens Nienhaus, Lohmar, Jurgen Vollmer, Siegburg, and Alfons Burghardt, Hennef, Germany, assignors to Firma Jean Wallerscheid K.G., Siegburg-Lohmar, Germany, a corporation of Germany
Filed Nov. 2, 1966, Ser. No. 591,588
Claims priority, application Germany, Mar. 15, 1966, W 41,142
Int. Cl. G08b 21/00
U.S. Cl. 340—282              5 Claims The present invention relates to indicating of the position of an adjusting device mounted on a rotatable member, more particularly, such an arrangement wherein the indicator is mounted on a stationary member and is responsive to a magnetic field established by the rotatable member so that there is no contact between the stationary and rotatable members.

In numerous types of machinery it is desired to be able to ascertain at all times the speed of rotation, direction of rotation, or even the state of a rotatable shaft which is conceiled from view during operation. Various forms of magnetic arrangements have already been devised for indicating the state of such concealed rotating members. Such arrangements generally require some form of contact between the rotating member and a stationary member of the machinery for transmitting information regarding the state of the rotating member. Previously known contact arrangements were generally not satisfactory since in many instances the degree of accuracy of the indicating arrangement depended to a large extent upon the accuracy and fit of cooperating rotating and stationary members.

It is therefore the principal object of the present invention to provide a novel and improved arrangement for indicating the position of an adjusting mechanism carried on a rotatable member without contact between the rotatable member and a stationary member upon which the indicating arrangement is mounted.

It is another object of the present invention to provide a simple and effective arrangement for indicating the position of an adjusting mechanism on a rotating machine part without contact between rotating and stationary machine parts.

In one aspect of the present invention by which the above objects are attained there is provided a rotating member having a magnet thereon for establishing a magnetic field and a stationary member carrying means responsive to the magnetic field. An adjusting mechanism is carried by the rotatable member and is movable between two operating positions. A shield is carried by the rotatable member and is movable between two positions. In one position the shield is interposed in the magnetic field between the magnetic means and the magnetic responsive means so as to disturb this field and in the other position the shield is withdrawn from the magnetic field so that the field is un-disturbed. The shield is operatively connected to the adjusting mechanism so as to be movable to its positions in response to the operating positions of the adjusting mechanism. An indicating circuit is then connected to the magnetic responsive means and is actuated thereby to indicate the operating position of the adjusting mechanism.

The shield may comprise a sleeve which is slidably mounted on the rotatable shaft on which the rotatable member is mounted. The sleeve thus will have limited axial movement between its two positions. The slidable sleeve may itself be either an adjusting member or may be operatively connected to an adjusting mechanism.

The shield may also comprise a screen pivotally mounted on the rotatable member and pivoted in response to the position of a rotatable indexing ring carried on the rotatable member.

Regardless of the structure which is employed for a particular mechanism to carry out the teachings of the present invention it will be apparent that there is no contact between the rotating and stationary parts of the machinery. However, the indicating arrangement of the present invention will at any time indicate the position of an adjusting device carried on the rotating member both when the rotatable member is rotating or stationary. Further the indicating arrangement of the present invention is simple in construction, reliable in operation and can be readily incorporated into numerous forms of machinery at a very small additional expense.

Other objects and advantages of the present invention will be apparent upon reference to the accompanying description when taken in conjunction with the following drawings where:

FIGURE 3 is similar to FIGURE 2 but showing the pivotable shield in its second position; and FIGURE 4 is a front elevational view of the shield and magnetic field structure illustrated in FIGURES 2 and 3.

Proceeding next to the drawings wherein like reference symbols indicate the same parts throughout the various views a specific embodiment and modifications of the present invention will be described in detail.

Figure 1:
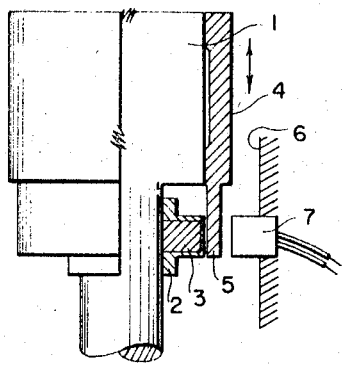
FIGURE 1 is an elevational view of a rotatable shaft and a stationary member showing one embodiment of the present invention with portions thereof being in sections.

In an embodiment of the present invention as illustrated in FIGURE 1 there is shown a rotatable shaft 1 having an annular housing 2 mounted thereon with a magnet 3 being contained within the housing. The magnet may be either a permanent magnet or an electromagnet. Slidably mounted on the shaft 1 is a sleeve 4 which has an annular extension 5. The sleeve 4 is axially movable between two operating positions with one of the operating positions being shown in FIGURE 1. In this position the annular extension 5 extends over the magnet 3 so as to be interposed in the magnetic field established by this magnet. In the other position of the sleeve 4 the annular extension 5 is withdrawn from the magnetic field so that the magnetic field is undisturbed. While not shown in the drawings stops or other structures may be provided to limit the range of axial movement of the sleeve. The sliding sleeve may itself be an adjusting member for achieving a certain state of operation, such as actuating a clutch carried by the rotatable shaft 1, or the sleeve may merely be operatively connected to an adjusting member so as to be movable in response to this member.

Positioned adjacent the rotatable shaft 1 is a stationary member 6 of the machinery on which is mounted a receiver 7 which is responsive to the magnetic field established by the magnet 3. The receiver 7 is positioned radially outwardly of magnet 3 so that the axial extension 5, which is in the nature of a shield, is interposed between magnet 3 and the receiver 7.

Figure 2:
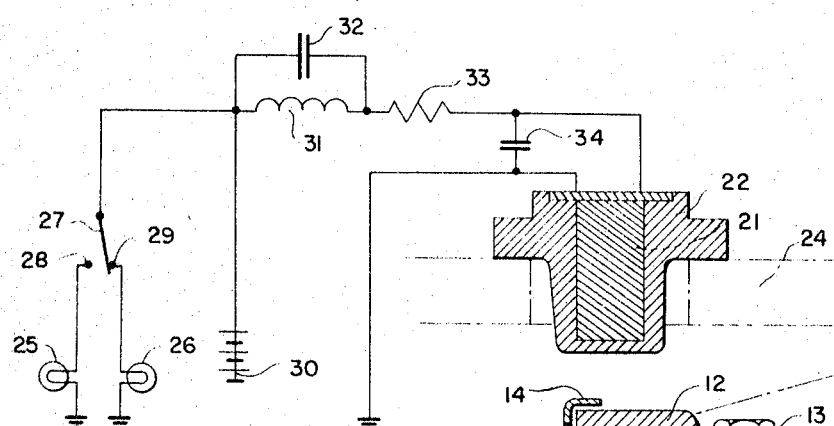
FIGURE 2 is an elevational view of another embodiment of the present invention with portions thereof being shown in section and showing the pivotable shield in one position to disturb the magnetic field with the indicating circuit being shown schematically.
Figure 2:
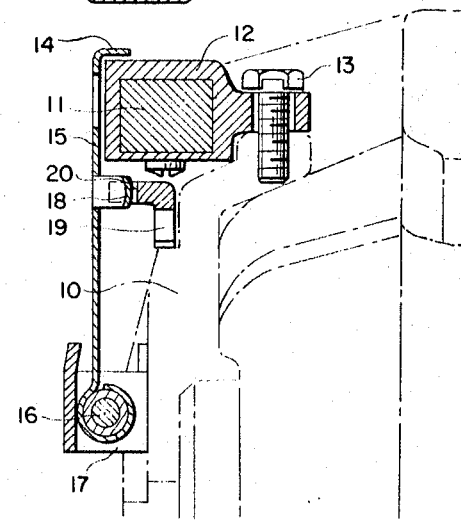

Proceeding next to FIGURES 2–4 there is illustrated an embodiment of the invention wherein the rotatable member comprises a clutch casing 10 of a motor vehicle clutch. Mounted on the clutch casing is a magnet 11 enclosed in a housing 12 secured to the clutch casing by bolts 13. FIGURE 2 shows a shield 14 interposed in the magnetic field of magnet 11. The shield or screen 14 is located at the end of an arm 15 which is pivotally mounted to the clutch casing 10 by means of a pin 16 journaled in a bracket 17. The shield arm 15 is provided with a lug 18 which engages recesses in an indexing ring 19 rotatably mounted on the clutch housing 10. The indexing ring is advanced step-wise by actuating mechanism during the disengagement of the clutch. The lug 18 is so positioned with respect to recesses 20 on the indexing ring that when the clutch is in one position the shield 14 is in the position as indicated in FIGURE 2 and when the clutch is in the other position the shield is in the position as shown in FIGURE 3. This indexing ring structure is similar to that disclosed in the copending patent application filed on the same day as the present application and having the inventors Nienhaus et al.

When the shield 14 is in the indexing position as shown in FIGURE 3 the shield is held in this position against the force of its return spring (not shown) to such an extent that it no longer interfers with the magnetic field of the magnet 11.

Responsive to the magnetic field established by magnet 11 is a receiver 21 housed in an enclosure 22 mounted by bolts 23 on a stationary structure 24 of the vehicle or other machinery in which this system is incorporated.

The magnetic field between magnet 18 and receiver 21 is utilized to control an electrical optical indicating system comprising different colored lamps 25 and 26. These lamps are energized by a switch 27 operable between stationary contacts 28 and 29. The indicating system also includes a source of electrical energy such as a battery 30.

To maintain constant indication there is provided a switching relay 31 which receives continuous current from a charging capacitor in a known manner. A series resistance 33 is provided to adapt the system to the speed range in which the indicating or signal device is to operate. A capacitor 34 is also provided across the leads extending from the magnetic receiver 21.

As can be seen by a comparison of FIGURES 2 and 3 when the shield 14 is in position as shown in FIGURE 2 the lamp 26 will be illuminated, and when the shield is in the position shown in FIGURE 3 so as not to interfere with the magnetic field the lamp 25 is illuminated. As will be evident from the electrical circuit diagrams shown schematically in FIGURES 2 and 3 this electrical indicating circuit operates in a conventional manner.

It is pointed out, however, that the position of the indexing ring 19 as it intermitently rotates by steps around the clutch casing 10 produces either the shielding or screening effect as shown in FIGURE 2 or leaving the magnetic field of the system 11, 21 undisturbed as shown in FIGURE 3. This function is of particular significance when the clutch of the present invention is employed on a vehicle in such a manner that the two indexing positions of the indexing ring are associated with a different direction of travel of the vehicle. It will be readily apparent that it is necessary to indicate this direction of travel to the vehicle operator for reasons of safety.

Thus it can be seen that the present invention provides a simple but effective ararngement for indicating the position of an actuating device mounted on a rotating member without the necessity for any direct contact between the rotating member and a stationary member upon which the indicator is mounted. This arrangement is particularly adapted for use with a double friction clutch wherein a rotatably mounted index ring is employed to determine which of the two clutches will be disengaged. The shield or screen which is selectively interposed in the magnetic field may comprise a variety of structure dependent upon the environment in which this indicating arrangement is to be employed.

What is claimed is:

1. In an arrangement for indicating on a stationary member the position of an adjusting mechanism carried by a rotatable member without contact between the stationary and rotatable members, the combination of a rotatable member having means thereof for establishing a magnetic field, an adjusting mechanism carried by said rotatable member and movable between a plurality of operating positions, a stationary member having means thereon responsive to said magnetic field, a shield mounted on said rotatable member and movable between a first position wherein the magnetic field between said magnetic means and said magnetic responsive means is undisturbed and a second position wherein said magnetic field is disturbed, and means on said rotatable member for moving said shield to its positions in response to the operating position of said adjusting member.

2. In an arrangement as claimed in claim 1 and further comprising means actuated by said magnetic responsive means for indicating the operating position of said adjusting mechanism.

3. In an arrangement as claimed in claim 1 and further comprising a rotatable shaft upon which said rotatable member is mounted, said shield comprising a sleeve slidably mounted on said shaft for limited axial movement thereon between said first and second positions.

4. In an arrangement as claimed in claim 3 with said sleeve being operatively connected to said adjusting mechanism.

5. In an arrangement as claimed in claim 1 with said shield comprising a screen pivotally mounted on said rotatable member for movement between said first and second positions, and an indexing ring rotatably mounted on said rotatable member and operatively connected to said adjusting mechanism so that movement of said indexing ring moves said adjusting mechanism between said operating positions.

References Cited

UNITED STATES PATENTS 2,485,245  10/1949  Schoenbaum  340—282 XR
3,282,099  11/1966  Kingman  340—271 XR

OTHER REFERENCES

Burk, H. H. Jr., "Position Indicating Means," IBM Technical Disclosure Bulletin, vol. 6 No. 12, May 1964, pp. 42 and 43.

JOHN W. CALDWELL, Primary Examiner

S. M. BOBBITT, Assistant Examiner

U.S. Cl. X.R.

335—205; 340—271